United States Patent [19]

Beall et al.

[11] Patent Number: 4,608,348

[45] Date of Patent: Aug. 26, 1986

[54] GLASS-CERAMICS CONTAINING CRISTOBALITE AND POTASSIUM FLUORRICHTERITE

[75] Inventors: George H. Beall, Big Flats; John E. Megles, Jr., Corning; Linda R. Pinckney, Painted Post, all of N.Y.

[73] Assignee: Corning Glass Works, Corning, N.Y.

[21] Appl. No.: 794,841

[22] Filed: Nov. 4, 1985

[51] Int. Cl.[4] .................. C03C 10/16; C03C 3/112
[52] U.S. Cl. ........................................ 501/3; 501/57
[58] Field of Search ................................ 501/3, 57

[56] References Cited

U.S. PATENT DOCUMENTS 4,467,039 8/1984 Beall et al. .................. 501/3

Primary Examiner—Mark L. Bell
Attorney, Agent, or Firm—C. S. Janes, Jr.

[57] ABSTRACT

This invention is directed to the production of glass-ceramic articles exhibiting great toughness, a modulus of rupture of at least 20,000 psi, and, in the form of bars having dimensions 5"×0.5"×0.1", sagging during the crystallization heat treatment of no more than 0.2" over a 4" span, and wherein potassium fluorrichterite constitutes the predominant crystal phase but wherein cristobalite is also present in an amount of at least 10% by volume. The inventive articles having an overall composition consisting essentially, in weight percent on the oxide basis, of:

| | | | |
|---|---|---|---|
| $SiO_2$ | 65–69 | $Na_2O$ | 1.5–3.3 |
| $Al_2O_3$ | 0.75–3.5 | $K_2O$ | 4.2–6.0 |
| MgO | 13.5–17.5 | BaO | 0–2.5 |
| CaO | 3–4.8 | $P_2O_5$ | 0–2.5 |
| $Li_2O$ | 0.5–2.0 | F | 3.3–5.5 |

3 Claims, No Drawings

GLASS-CERAMICS CONTAINING CRISTOBALITE AND POTASSIUM FLUORRICHTERITE

BACKGROUND OF THE INVENTION

The field of glass-ceramics had its origin in U.S. Pat. No. 2,920,971. As is explained therein, glass-ceramic articles are produced through the controlled crystallization in situ of precursor glass articles. The process of manufacture customarily contemplates three basic elements: first, a glass-forming batch to which a nucleating agent is frequently added is melted; second, that melt is cooled to at least within and commonly below the transformation range thereof and a glass article of a desired geometry simultaneously shaped therefrom; and, third, that glass article is exposed to a predefined heat treatment to cause the generation of crystals in situ. Experience has indicated that often more extensive crystallization can be obtained and the crystals are of a more uniform size when the heat temperature step is performed in two stages. That practice involves initially subjecting the parent glass article to a temperature within or somewhat above the transformation range to cause the development of a myriad of nuclei in the glass, and thereafter raising the temperature to approach or even exceed the softening point of the glass to effect the growth of crystals on those nuclei. (The transformation range has been defined as that temperature at which a molten material is converted into an amorphous mass, that temperature generally being deemed as lying in the vicinity of the annealing point of a glass.)

Glass-ceramic articles are normally highly crystalline, viz., greater than about 50% by volume crystalline. Therefore, the articles are usually mechanically stronger than the precursor glass bodies from which they are produced. For example, annealed glass articles conventionally exhibit modulus of rupture values between about 5000–10,000 psi. In contrast, glass-ceramic articles customarily demonstrate modulus of rupture levels in the range of about 10,000–20,000 psi. Whereas the latter values represent a substantial improvement, much research has been conducted in efforts to augment the strength thereof.

The major emphasis in such efforts has involved means for developing surface compression layers on the articles. One method for accomplishing that goal has comprehended applying or forming in situ a surface layer of different chemical or crystalline composition; e.g., through the application of a glaze having a coefficient of thermal expansion lower than that of the glass-ceramic or by heat treating in such a manner to obtain a surface layer of crystals different from the crystal phase in the interior of the glass-ceramic and having a lower coefficient of thermal expansion. A second procedure has utilized a chemical strengthening technique via an ion exchange reaction. The development of a surface compression layer is, indeed, effective in increasing the mechanical strength of glass-ceramic articles, but such a layer is also accompanied with certain practical disadvantages.

First, as can be readily appreciated from the above description, the formation of a surface compression layer involves a further process which obviously adds to the cost of the product. Second and more critically, however, compression strengthening does not heighten the toughness of a glass-ceramic. The property of toughness is extremely important in imparting resistance to catastrophic failure when damage results from impacts received. Hence, where the intrinsic toughness of a body is low, tensile stress concurrently developed in the interior of the body to compensate for surface compression can lead to the body sharply fragmenting into many small pieces upon receiving impacts sufficient to cause fracture. That phenomenon is especially unwanted in consumer products where it is most desirable that any breakage be of a "gentle" nature with but a few large pieces resulting therefrom.

U.S. Pat. No. 4,467,039 is directed to the production of one composition system of glass-ceramic articles which exhibit much improved toughness, coupled with modulus of rupture values in excess of 20,000 psi. Those articles contained potassium fluorrichterite as the predominant crystal phase with the sometime presence of canasite as a secondary phase. Where the material is designed for use in tableware applications, the occurrence of potassium fluorrichterite as the sole crystal phase is preferred. The general composition ranges consist essentially, expressed in terms of weight percent on the oxide basis, of

| $SiO_2$ | 50–70 | $Na_2O$ | 2–9 |
|---|---|---|---|
| CaO | 4–15 | $K_2O$ | 2–12 |
| MgO | 8–25 | $Li_2O$ | 0–3 |
| F | 3–8 | $Al_2O_3$ | 0–7 | with the preferred compositions utilizing $CaF_2$ as a nucleating agent and consisting essentially, expressed in terms of weight percent on the oxide basis, of

| $SiO_2$ | 57–68 | $Na_2O$ | 2.5–5 |
|---|---|---|---|
| $Al_2O_3$ | 0–4 | $K_2O$ | 3–7 |
| CaO | 0–3 | MgO | 14–18 |
| $CaF_2$ | 7–12 | | |

(Because it was not known with which cation(s) the fluoride was combined, it was reported as $CaF_2$, the batch constituent through which the fluoride was incorporated into the batch.)

As has been explained in the above general description of the production of glass-ceramic articles, the generation of crystals in situ involves heating to temperatures above the transformation range and, frequently, above the softening point of the parent glass. It will be appreciated that raising the temperature of a glass above its transformation range subjects it to thermal deformation and slumping. Such distortion is self-evidently unwanted since formers or other types of support are required to maintain the desired contour and shape of a glass article. Accordingly, to minimize thermal distortion during the crystallization of a glass body to a glass-ceramic, the temperature is controlled in an effort to grow crystals at a rate sufficient to provide support for the body as the temperature is necessarily raised to achieve maximum crystallization. Yet another factor which must be reckoned with is the quantity and identity of the residual glassy matrix of a glass-ceramic article. Thus, whereas glass-ceramics are frequently very highly crystalline, in some instances over 90% by volume crystalline, a minor amount of glass customarily remains. As can be appreciated, the composition of this residual glass will most commonly be quite different from that of the parent glass body since the components comprising the crystals will have been removed therefrom. Consequently, glass compositions manifesting the least thermal distortion during crystallization to a glass-ceramic will exhibit the following three features:

(1) they crystallize very rapidly upon heat treatment;
(2) the final product is highly crystalline; and
(3) the residual glass is highly refractory.

U.S. Pat. No. 4,467,039 explains that the maximum reduction in glass fluidity during crystallization of the precursor glass to a glass-ceramic, with consequent improved resistance to thermal sagging, is achieved in articles wherein potassium fluorrichterite constitutes the sole crystal phase. But, as was also discussed therein, glass having the stoichiometric composition of potassium fluorrichterite fragments into small pieces as it is being crystallized through heat treatment. That behavior was conjectured to be the result of the glass crystallizing extremely rapidly at temperatures where the glass is at a high viscosity, a condition which prevails where there is very little residual glass. Hence, the above-tabulated ranges of components delineating the preferred compositions illustrate an effort to provide a residual glass phase and to carefully control the constituents of that glass.

Consequently, as is explained therein, a high $SiO_2$ content was utilized to minimize fluidity of the glass. However, there is an explicit warning against the use of such a high level of $SiO_2$ that cristobalite crystals are generated during the crystallization of the parent glass body. Minor additions of $Al_2O_3$ and/or BaO were suggested to counteract that phenomenon. Furthermore, a careful balance of MgO and CaO contents was demanded to control glass fluidity, as was the relationship of $K_2O$ and $Na_2O$ concentrations.

Whereas the glass-ceramic articles of U.S. Pat. No. 4,467,039 do, indeed, demonstrate high toughness and mechanical strength and relatively good resistance to thermal deformation during the crystallization heat treatment, research has continued to improve upon the latter quality.

Accordingly, the primary objective of the instant invention was to devise glass-ceramic compositions displaying high toughness and mechanical strength which exhibit virtually no thermal deformation, as measured through a sag test, during crystallization of the precursor glass.

SUMMARY OF THE INVENTION

We have achieved that objective through an improvement upon the disclosure of U.S. Pat. No. 4,467,039. Thus, the present invention comprises careful control of the contents of $Li_2O$, $Na_2O$, $K_2O$, MgO, CaO, $Al_2O_3$, $SiO_2$, and F, plus the optional inclusion of BaO and $P_2O_5$, to yield a glass-ceramic body containing potassium fluorrichterite as the predominant crystal phase, but also containing substantial concentrations of cristobalite. The inventive materials in bars having dimensions 5"×0.5"×0.1" demonstrate sagging during the crystallization heat treatment of nor more than 0.2" over a 4" span. The criticality of composition control is evidenced in the narrow operable ranges recited below in terms of weight percent on the oxide basis.

| $SiO_2$ | 65–69 | $Na_2O$ | 1.5–3.3 |
| --- | --- | --- | --- |
| $Al_2O_3$ | 0.75–3.5 | $K_2O$ | 4.2–6.0 |
| MgO | 13.5–17.5 | BaO | 0–2.5 |
| CaO | 3–4.8 | $P_2O_5$ | 0–2.5 |
| $Li_2O$ | 0.5–2.0 | F | 3.3–5.5 |

Up to 5 mole percent total of compatible metal oxides may optionally be added. Examples of such include SrO, $TiO_2$, $B_2O_3$, $ZrO_2$, and ZnO. $As_2O_3$ and/or $Sb_2O_3$ may be included in customary amounts as fining agents, and various known colorants, such as CdO, CoO, $Cr_2O_3$, $Fe_2O_3$, $MnO_2$, NiO, CdS, $Er_2O_3$, $Nd_2O_3$, Se, and $V_2O_5$, may be present in conventional amounts, perhaps up to 5% but normally not exceeding a total of about 1% by weight.

The desired low thermal distortion is a result of composition adjustments comprising (compared with compositions of U.S. Pat. No. 4,467,039) relatively high MgO, $K_2O$, $Li_2O$, and F concentrations, coupled with relatively low values of $Na_2O$ and CaO. The high levels of $K_2O$, MgO, and F increase the amount of early crystallizing mica and the final content of potassium fluorrichterite, thereby reducing thermal distortion and increasing mechanical strength. Similarly, a high level of $Li_2O$ promotes the early crystallization of cristobalite at the expense of residual glass, thereby reducing the time required for the crystallization heat-treatment and also enhancing the mechanical strength of the final product. The $SiO_2$ content is kept relatively high and $P_2O_5$ may be included to aid in insuring a workable glass viscosity.

The presence of cristobalite has a second advantage in that it raises the linear coefficient of thermal expansion of the glass-ceramic, thereby permitting the application of a lower expansion glaze thereon. Hence, through careful control of composition, it is possible to tailor the amount of cristobalite developed in the glass-ceramic in order to match the thermal expansions of a variety of glazes.

A key factor in lowering the thermal deformation is the change in the compositions of the residual glass. Thus, the concentrations of the strong fluxes $Na_2O$ and CaO are retained low so as to preferentially enter the fluorrichterite crystals and not become part of and flux the residual glass.

Certain compositions have been observed which, although falling outside of the ranges defining the inventive products, nevertheless display excellent resistance to distortion. Such compositions, however, have been subject to other problems which have rendered them impractical. Two illustrations of such compositions are: (1) compositions high in MgO and F crystallize very quickly at high viscosities, hence evidence very low thermal distortion, but the precursor glasses are extremely difficult to form into devitrification-free glass shapes because of very high fluorrichterite liquidus temperatures and low glass viscosities; and (2) compositions low in $Al_2O_3$ demonstrate acceptable resistance to thermal distortion but have a very high cristobalite liquidus temperature.

In effect, the bulk composition is rigorously tailored such that during crystallization of the cristobalite and fluorrichterite, that is, during the high temperature portion of the heat treatment schedule when most of the deformation takes place, the crystals grow in a matrix of stiff, essentially alkaline earth metal and alkali metal-free residual glass, which minimizes deformation during crystallization. However, this highly viscous glass, rich in $SiO_2$, $Al_2O_3$, and optionally $P_2O_5$, is sufficiently fluid to allow optimum grain growth during the crystallization heat treatment, resulting in crystals of fluorrichterite exhibiting interlocking high aspect ratios with no substantial microcracking of the body being evidenced.

The final product is very highly crystalline with a phase assemblage comprising at least 10% and, more desirably, up to about 25% cristobalite. In some compositions, a minor amount of a fluorophlogopite mica phase has been identified. Mechanical strength, as measured in terms of modulus of rupture on abraded bars, routinely exceeds 20,000 psi. Furthermore, inasmuch as the presence of cristobalite raises the linear coefficient of thermal expansion of the glass-ceramic (ranging between about $100-140 \times 10^{-7}/°C$. over the temperature interval of 0°–300° C.), a glaze having a lower coefficient of thermal expansion may be applied thereto to produce a surface compression layer on the glass-ceramic to further increase the mechanical strength thereof. The toughness of the base material has been measured to exceed twice that of standard commercial culinary and dinnerware glass-ceramic compositions. Finally, a very practical advantage results from the instant invention. Because the crystallization of cristobalite occurs at lower temperatures, the heat treatment process can be shortened, thereby reducing overall production costs.

The method for producing the inventive glass-ceramic article comprehends four general steps:

(a) a glass-forming batch of a predetermined composition is melted;

(b) that melt is cooled to a temperature at least below the transformation range thereof and a glass article of a desired configuration is simultaneously formed therefrom;

(c) that glass article is exposed to a temperature within the range of about 750°–1050° C. for a period of time sufficient to effect the generation of potassium fluorrichterite and cristobalite crystals in situ; and thereafter (d) the crystallized article is cooled to room temperature.

Where desired, Step (c) may be divided into two stages; viz., the glass article will first be subjected to a temperature within the interval of about 550°–700° C. for a period of time sufficient to develop nuclei and cause incipient crystallization therein (e.g., about 0.5–6 hours), and then exposed to a temperature within 750°–1050° C. for a periof of time sufficient to cause the growth of crystals on the nuclei (e.g., about 0.5–8 hours).

RELATED APPLICATION

U.S. application Ser. No. 735,660, filed May 20, 1985 under the title GLAZES FOR GLASS-CERAMIC ARTICLES in the names of George H. Beall, Paul S. Danielson, John E. Megles, Jr., and Walter H. Tarcza and assigned to the assignee of the present application, discloses glaze compositions especially suitable for use with glass-ceramics wherein potassium fluorrichterite comprises the predominant crystal phase.

DESCRIPTION OF PREFERRED EMBODIMENTS

Table I records several glass compositions, expressed in terms of parts by weight on the oxide basis, illustrating the compositional parameters of the present invention. Inasmuch as it is not known with which cation(s) the fluoride is combined, it is merely tabulated in terms of fluoride in accordance with conventional glass analysis practice. Furthermore, since the sum of the individual constituents in each glass closely approximates 100, for all practical purposes the recited values in Table I may be deemed to reflect weight percent. Finally, the actual batch ingredients may comprise any materials, either oxides or other compounds, which, when melted together, will be converted into the desired oxides in the proper proportion.

In producing the exemplary compositions reported in Table I, the batch materials were compounded, ball-milled together to aid in obtaining a homogeneous melt, and charged into platinum crucibles. After placing lids thereon, the crucibles were introduced into a furnace operating at about 1250°–1450° C., and the batches melted for about four hours. Thereafter, the melts were poured into steel molds to produce rectangular glass slabs having the dimensions of about $5'' \times 6'' \times 0.5''$, and those slabs were immediately transferred to an annealer operating at about 600°–650° C.

TABLE I

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 65.5 | 65.2 | 67.3 | 67.3 | 67.3 | 66.3 | 67.3 | 65.3 | 66.7 | 66.2 | 65.6 | 66.0 | 64.0 | 67.3 |
| $Al_2O_3$ | 0.8 | 0.8 | 1.2 | 1.2 | 1.2 | 1.12 | 1.75 | 1.2 | 2.4 | 3.6 | 2.2 | 1.0 | 2.0 | 1.8 |
| MgO | 17.9 | 18.5 | 15.25 | 15.25 | 15.25 | 15.23 | 1.75 | 1.2 | 14.7 | 14.1 | 16.9 | 15.0 | 14.5 | 14.7 |
| CaO | 3.4 | 4.0 | 3.9 | 3.9 | 3.9 | 3.9 | 3.9 | 3.3 | 3.9 | 3.4 | 4.7 | 6.5 | 6.5 | 4.6 |
| $Na_2O$ | 1.9 | 2.2 | 2.1 | 2.1 | 2.1 | 2.1 | 2.2 | 2.1 | 2.2 | 1.9 | 2.6 | 3.0 | 4.0 | 3.5 |
| $K_2O$ | 6.3 | 5.8 | 5.3 | 5.3 | 5.3 | 5.3 | 4.9 | 5.3 | 4.8 | 4.1 | 4.0 | 5.0 | 4.0 | 4.7 |
| $Li_2O$ | 1.3 | 1.0 | 1.1 | 1.1 | 1.1 | 1.0 | 0.9 | 1.0 | 1.4 | 0.6 | 0.2 | 1.0 | 1.0 | 0.75 |
| BaO | — | — | 0.2 | 0.2 | 0.2 | 0.2 | 0.2 | 0.2 | 0.2 | 4.2 | 2.1 | — | 1.5 | 0.25 |
| $P_2O_5$ | — | — | 1.0 | 1.0 | 1.0 | 2.0 | 1.0 | 2.0 | 1.1 | — | — | — | — | 1.1 |
| F | 5.1 | 4.7 | 5.1 | 4.9 | 4.7 | 5.0 | 4.6 | 5.1 | 4.3 | 3.2 | 3.2 | 4.4 | 4.4 | 4.4 |
| $B_2O_3$ | — | — | — | — | — | — | — | 1.0 | | | | | | |
| $Sb_2O_3$ | | | | | | | | | 0.2 | — | — | | | |

Bars having dimensions of $4'' \times 0.3125'' \times 0.3125''$ were cut from each slab to be used for the measurement of modulus of rupture to be carried out in the conventional manner. Other bars having dimensions of $5'' \times 0.5'' \times 0.1''$ were cut from each slab to be used to test the resistance of the glass to thermal sagging during the crystallization heat treatment.

The modulus of rupture bars plus the remainder of the slabs were placed inside an electrically-heated furnace, the temperature raised within the furnace at a rate of about 300° C./hour to 980° C., the temperature maintained thereat for about two hours, and thereafter the electric current to the furnace was cut off and the furnace allowed to cool to room temperature with the specimens retained therewithin. It has been estimated that this "cooling at furnace rate" procedure involves an average cooling of about 200° C./hour.

Various modifications in the heat treatment practice are possible. For example, the precursor glass body can be heated quite rapidly to a nucleating temperature range, held within that range to promote nucleation, and thereafter heated at a moderate rate to the final crystallization temperature.

Whereas the glasses of the instant invention crystallize very rapidly, it will be appreciated that crystallization is not instantaneous. Accordingly, caution demands that temperature increases in excess of about 600° C./hour be avoided.

The 5"×0.5"×0.1" glass bars were placed on ceramic supports spaced 4" apart and that assemblage introduced into the above-described electrically-heated furnace. After exposure to the same crystallization heat treatment as above, the depth of sagging of each bar was measured in terms of sixteenths of an inch. Those values (Sag) are reported below in Table II. The + and − signs indicate sagging somewhat more or less than the cited sixteenth inch.

The crystallized modulus of rupture bars were surface abraded by tumbling with 30 grit SiC. Modulus of rupture (MOR) measurements were conducted in the conventional manner by center loading the bars resting on knife edge supports spaced 3" apart. Those values are also recorded below in Table II in terms of psi.

X-ray diffraction analyses and electron microscopy were employed to identify the crystal phases present in the inventive glass-ceramic articles. In all instances, potassium fluorrichterite comprised by far the predominant phase and a fluorphlogopite mica constituted the least. Cristobalite appeared present in amounts greater than about 10% and, usually, at levels around 20%.

TABLE II

| Example | Sag | MOR |
|---------|-----|--------|
| 1 | 1+ | 19,900 |
| 2 | 3− | 16,900 |
| 3 | 2− | 23,000 |
| 4 | 3− | 20,900 |
| 5 | 3− | 20,200 |
| 6 | 1− | — |
| 7 | 1− | — |
| 8 | 1− | — |
| 9 | 3− | — |
| 10 | 13 | — |
| 11 | 12+ | — |
| 12 | >15 | — |
| 13 | >15 | — |
| 14 | 12 | — |

As can be seen, the most preferred compositions evidence high moduli of rupture with sag values of less than 0.2".

Examples 10-14 illustrate the criticality of maintaining the levels of the individual components within the sharply defined ranges of the inventive compositions in order to secure the desired high resistance to thermal distortion. Thus, the compositions of Examples 10-14 fall slightly outside of the required limits.

Hence, in Example 10 the concentrations of $K_2O$ and F are below and that of BaO is above the prescribed content of each.

In Example 11, the amounts of $K_2O$ and F are below the respective levels required.

In Example 12, the level of CaO is too high.

In Example 13, the quantities of $SiO_2$ and $K_2O$ are too low and those of $Na_2O$ and CaO are too high.

In Example 14, the $Na_2O$ content exceeds the maximum tolerated in the present compositions.

We claim:

1. A highly crystalline glass-ceramic article exhibiting great toughness, a modulus of rupture of at least 20,000 psi, and, in the form of bars having dimensions 5"×0.5"×0.1", sagging during the crystallization heat treatment of no more than 0.2" over a 4" span, and wherein potassium fluorrichterite constitutes the predominant crystal phase, but wherein cristobalite is also present in an amount of at least 10% by volume, said glass-ceramic article having an overall composition consisting essentially, expressed in terms of weight percent on the oxide basis, of

| | | | |
|---|---|---|---|
| $SiO_2$ | 65–69 | $Na_2O$ | 1.5–3.3 |
| $Al_2O_3$ | 0.75–3.5 | $K_2O$ | 4.2–6.0 |
| MgO | 13.5–17.5 | BaO | 0–2.5 |
| CaO | 3–4.8 | $P_2O_5$ | 0–2.5 |
| $Li_2O$ | 0.5–2.0 | F | 3.3–5.5 |

2. A glass-ceramic article according to claim 1 also containing up to 5 mole percent total of compatible metal oxides selected from the group of SrO, $TiO_2$, $B_2O_3$, $ZrO_2$, and ZnO.

3. A glass-ceramic article according to claim 1 also containing up to about 5% by weight of colorants selected from the group of CdO, CoO, $Cr_2O_3$, $Fe_2O_3$, $MnO_2$, NiO, CdS, $Er_2O_3$, $Nd_2O_3$, Se, and $V_2O_5$.

* * * * *